Jan. 13, 1970  R. ALTISSIMO  3,489,891
VEHICLE LAMP HOLDER
Filed July 25, 1967  3 Sheets-Sheet 1
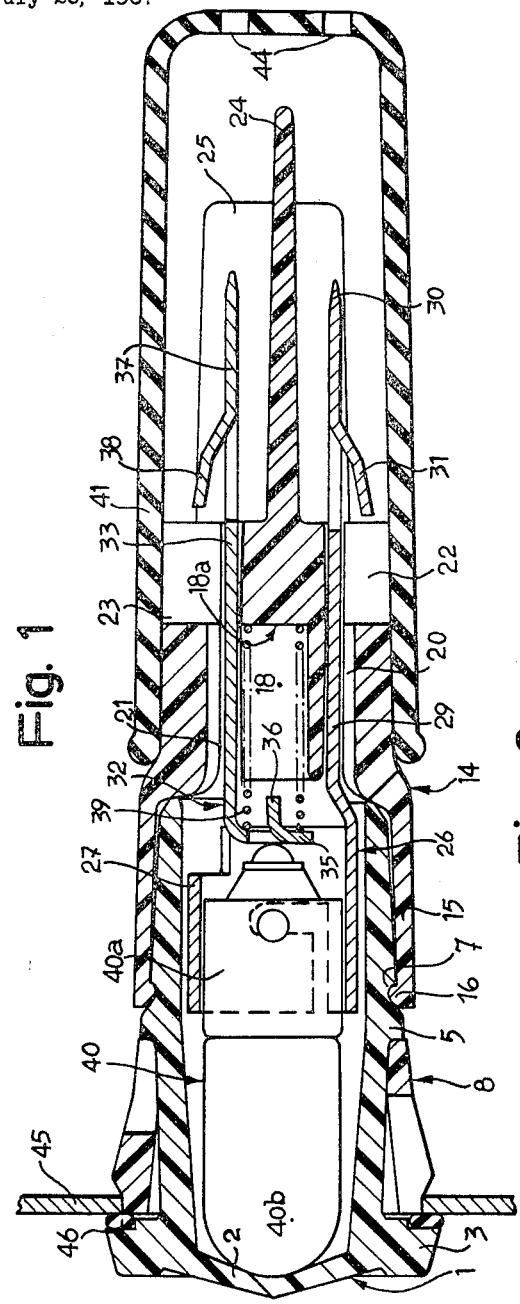
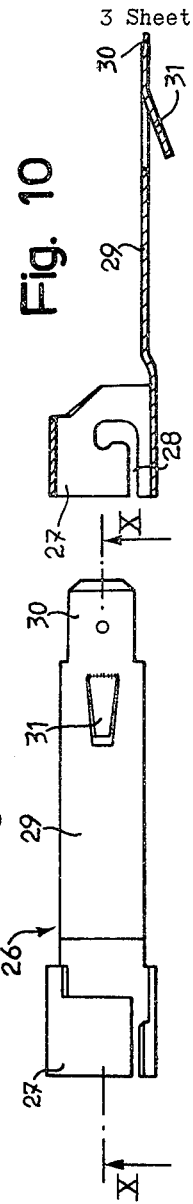
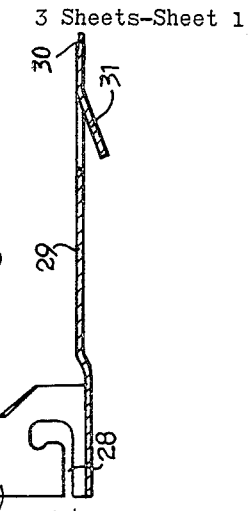

Jan. 13, 1970 R. ALTISSIMO 3,489,891
VEHICLE LAMP HOLDER
Filed July 25, 1967 3 Sheets-Sheet 2
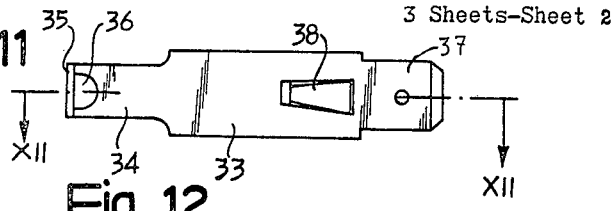
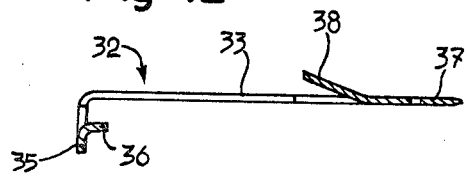
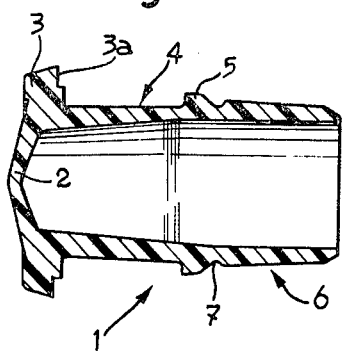
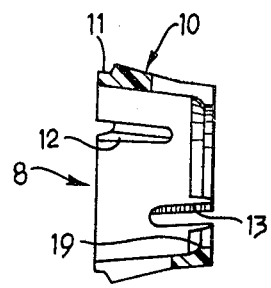
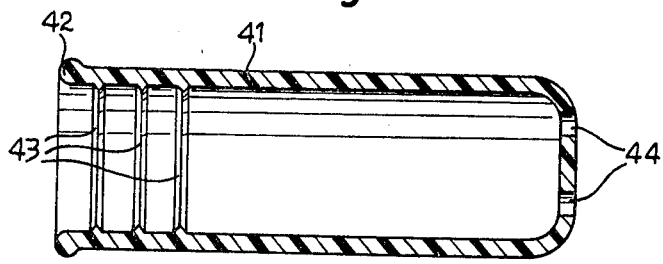

United States Patent Office 3,489,891
Patented Jan. 13, 1970

3,489,891
VEHICLE LAMP HOLDER
Renato Altissimo, Moncalieri, Turin, Italy, assignor to
Fiat Societa per Azioni, Turin, Italy
Filed July 25, 1967; Ser. No. 655,935
Claims priority, application Italy, July 27, 1966,
774,409/66
Int. Cl. B60q 3/04
U.S. Cl. 240—52.1                     8 Claims

ABSTRACT OF THE DISCLOSURE

A lamp holder capable of being attached in a hole in a panel, the lamp holder having a cover member that extends through the hole and an enlarged head on the outer end of the cover member which abuts the panel. A resilient retainer ring, located on the rear side of the panel between the panel and a ridge on the inner end of the cover member, holds the cover member resiliently in place. The retainer ring may be pushed through the hole from the front to the rear of the panel to permit easy assembly.

The invention relates to lamp holders, more particularly lamp holders on attachment to motor vehicles for use as stoplights, direction indicator lights, interior panel lights, or the like. Lamp holders are conventionally attached to a vehicle body by fasteners, such as screws, rivets or the like. Such lamp holders are fixed in a hole in a support plate and include, for example, a transparent plastics cover member removable for access to the lamp, the cover member having generally an enlarged head of greater width than the width of the hole.

An object of this invention is to provide a lamp holder which may be fastened to, for example, a vehicle body without requiring the use of screws or other like fasteners.

According to the present invention there is provided a lamp holder for fixture in a hole in a laminar support, the lamp holder including a plastics cover member which as outer and inner portions adapted to lie outwardly and inwardly respectively of the laminar support, the outer portion having an enlarged head of greater width than the hole into which the lamp holder is to be fitted and a resilient retainer ring disposed around the inner portion and adapted to engage resiliently the internal edge of the said hole and an abutment on the inner portion so as to hold the cover member and the remainder of the lamp holder in position in said hole.

The lamp holder of the present invention is held in position relative to the laminar support by the engagement of the cover member in the hole by a snap action, without any additional supporting or securing means.

Preferably the lamp holder has a plastics body which is detachably secured to the inner portion of the cover member by means of intergaging resilient parts, said body including housing means for receiving an electric lamp bulb and electrical contact means for making electrical contact with a bulb when received in said housing means.

Thus the body can be separated easily from the cover member without requiring any tools either for assembly or disassembly of the lamp holder.

The bulb housing means are preferably slidable longitudinally within the body to permit the reception of bulbs of different sizes, the electrical contact means including a base contact which is resiliently urged towards the cover member for making contact with the base electrodes of said bulbs of different sizes. In this way the holder may be rendered suitable for lamp bulbs of varying the length without necessitating replacement of any component or altering the optical properties of the cover member.

The invention particularly described, by way of example only, with reference to the accompanying drawings, wherein:

FIGURE 1 is an axial cross section of a lamp holder according to one embodiment of the invention for fixture to a motor vehicle, the lamp holder being shown in its assembled and fitted condition;

FIGURE 2 is an axial cross section of a cover member forming part of the lamp holder of FIGURE 1;

FIGURE 3 is an axial section of a retainer ring provided in the lamp holder of FIGURE 1;

FIGURE 9 is a side view of a bulb housing forming part of FIGURE 1;

FIGURE 10 is an axial cross section on line X—X of FIGURE 9;

FIGURE 11 is a side plan view of a bottom contact element of the lamp holder of FIGURE 1;

FIGURE 12 is a longitudinal cross section on line XII—XII of FIGURE 11, and

FIGURE 13 is an axial cross section of a protective outer case fitted to the rear end of the lamp holder.

Figure 5:
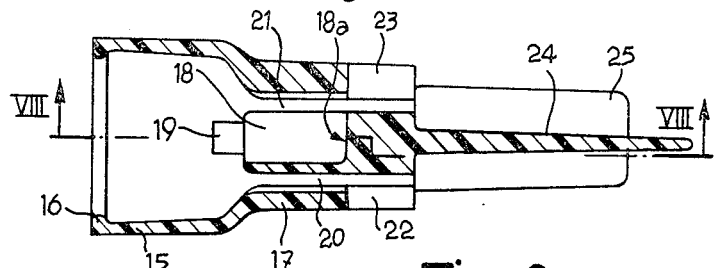
FIGURE 5 is an axial cross section of the said body on line V—V of FIGURE 4.

The lamp holder shown in FIGURE 1 comprises a transparent cover member 1 and a body 14 detachably interconnected by a snap action and in turn secured by snap action to a laminar support 45, which may be a sheet metal part of a vehicle by means of a retainer ring 8 disposed around the cover member 1 inwardly of the support 45.

The terms "inner" and "outer" will be used herein to refer to positions relative to the outer end of the lamp holder, which is to the left of FIGURE 1.

As shown in FIGURE 2, the cover member 1 comprises a tubular inner portion 4 and an outer portion 2 adapted to extend inwardly and outwardly of the support 45. The outer portion 2 has an integral lens or window and an enlarged head 3 constituting an annular flange surrounding the tubular portion 4. The head 3 is provided with an annular recess 3a on its inwardly facing surface.

The tubular inner portion 4 of the cover member 1 has a frusto-conical surface, tapering in diameter from an annular shoulder 5 towards the head 3. An annular groove 7 is provided inwardly of the shoulder 5, inwardly of which the portion 4 is provided with a radially inwardly tapering frusto-conical section 6.

The retainer ring 8 (FIG. 3) is fitted on the frusto-conical surface of the inner portion 4 between the shoulder 5 and the head 3.

The retainer ring 8 comprises an annular member of resilient flexible plastics material provided at its inner edge with a lip 19 adapted to abut the shoulder 5 on the inner portion 4 so as to retain the ring 8 on the cover member 1.

The ring 8 is formed with circumferentially spaced axial slots 12, 13, extending through its wall thickness alternate slots 12, 13, extending up to the outer and inner edges respectively of the ring 8 so as to give the two edges the necessary resiliency and to render the ring 8 resiliently expansible. The ring 8 is adapted to engage by snap action both the cover member 1 and the laminar support 45.

The outer edge of the ring 8 is provided on a frusto-conical portion 10 tapering in diameter inwardly, said outer edge having reduced wall thickness forming a circumferential notch 11 which engages the internal edge of the hole in the support 45 (FIGURE 11). A sealing ring 46 is interposed between the support 45 and head 3 of the cover member 1.

The retainer ring 8 enables the lamp holder to be fastened to the support 45 by providing a hole of suitable diameter in the support 45 and suitable aperture till the body introducing the assembled holder (FIGURE 1) into the hole from outside the support 45 until the ring 8 has passed through the hole, whereupon it expands resiliently, the notch 11 engaging the internal wall of the hole by a snap action.

In order to remove the lamp holder the ring 8 is compressed radially inwardly (preferably by means of a suitable tool) in order to permit the ring 8 to pass outwardly through the hole in an axial direction.

In the assembled and fitted condition (FIGURE 1) the head 3 on the cover member 1 abuts the outer surface of the laminar support 45, only the outer portion 2 of the cover member 1 being exposed.

The body 14 is shown separately in FIGURES 4 to 8 is also moulded from plastics material. The body 14 comprises a tubular portion 15 flaring outwardly towards an outer edge having a radially inwardly extending ridge 16, which on fitting of the body 14 to the cover member 1, is engaged in the annular groove 7 to locate the body 14 by a snap action.

Inwardly of the tubular portion 15 the body 14 has a solid intermediate portion 17 having a cylindrical blind bore 18 extending axially thereof. The bore 18 has a flat base 18a and two projections 19 are provided on opposite respective sides of the entrance to the bore 18.

Two parallel through apertures 20, 21 of substantially rectangular cross section are provided on either side of the blind bore 18.

The apertures 20, 21 communicate at the inner ends with two diametrically opposed transversely extending notches 22, 23, in the intermediate portion 17.

Figure 8:
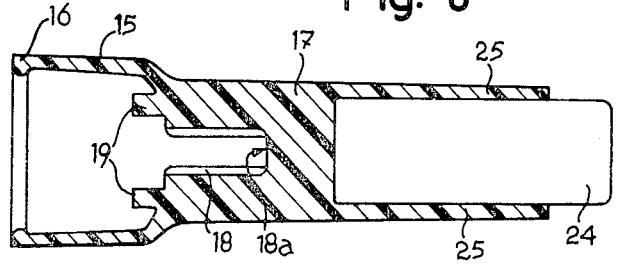
FIGURE 8 is an axial cross section on line VIII—VIII of FIGURE 5.
Figure 4:
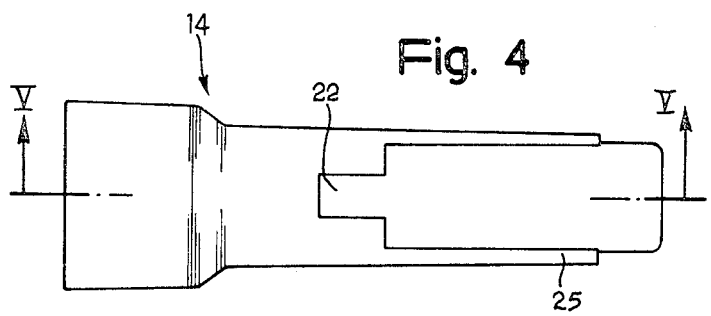
FIGURE 4 is a side view of a body portion of the said lamp holder.
Figure 6:
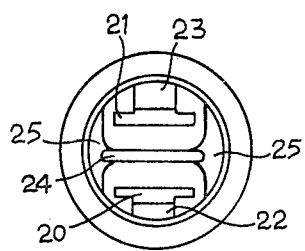
FIGURE 6 is a rear end view of the said body.
Figure 7:
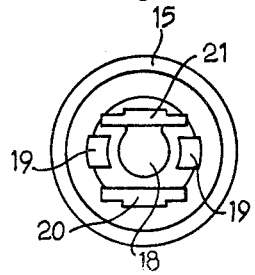
FIGURE 7 is a front end view of the said body.

Inwardly of the intermediate portion 17 the body 14 is provided with a central axially extending reinforcing rib 24, moulded with two side flanges 25, along opposite edges (FIG. 8).

The two longitudinal apertures 20, 21, receive respective electric components of the lamp housing. Thus a bulb housing 26 (FIGURES 9 and 10) and a base contact 32 (FIGURES 11, 12) are supported respectively in the apertures 20, 21.

The bulb housing 26 includes an outer substantially cylindrical portiton 27 with bayonet slots 28 for receiving the base 40a of a lamp bulb 40. An intermediate supporting and conducting element 29 extending through the aperture 20 is formed integrally with the portion 27, said element 29 terminating at its inner end on the other side of the aperture 20 in a pin 30 adapted to be connected with a current supply lead (not shown). An upstanding outwardly extending tongue 31 is interposed between the element 29 and the pin 30 so that, when the pin 30 is passed inwardly through the aperture 20, the tongue 31 springs outwardly and prevents removal of the pin 30 and housing 26 through the outer end of the lamp holder.

The size and positioning of the tongue 31 are such that the bulb housing 26 is capable of limited axial displacement with respect to the body 14 in order to permit bulbs 40 having envelopes 40b of varying length to be received in the housing 26.

The other longitudinal aperture 21 in the intermediate portion 17 receives a contact assembly 32 (FIGURES 11, 12) which comprises an intermediate conductor portion 33, a narrower outer portion 34 having an extension 35 bent at right angles and adapted to abut a base contact of the bulb 40 and a pin 37 at its inner end. The pin 37 is provided with an upstanding tongue 38 for retaining the contact assembly 32 and limiting its axially outward movement in the aperture 21, analogously to the tongue 31.

The extension 35 of the contact assembly 32 is provided with a rearwardly extending projection 36 adapted to be engaged by an opposing compression spring 39 housed in the blind bore 18 in the body 14 and bearing against the flat base 18a of the said bore 18.

The spring 39 urges the extension 35 and the bulb 40b contact therewith in an outward direction, the outer end of the bulb envelope 40b inner surface of the outer portion 2 of cover member 1, which inner surface may be suitably shaped to this end.

An outer case 41 of resilient material, such as rubber, is fitted to the inner end of the body 1. The case 41 is provided (FIGURE 13) with an enlarged outer edge 42 which fits over the solid intermediate portion 17 of the body 14. A plurality of internal circumferential ribs 43, is provided on the case 41 to assist its gripping action on the portion 17. Apertures 42 are provided at the inner end of the case 41 for the passage of current supply leads (not shown).

It will be understood that constructional details of the lamp holder according to the invention may be widely varied from those of the example hereinabove without departing from the scope of the invention.

I claim:

1. A lamp holder for fixture to a laminar support surrounding a hole said lamp holder including a plastics cover member having outer and inner portions, an enlarged head on the outer portion, a resilient retainer ring disposed around the inner portion, and abutment means on the inner portion against which the retainer ring bears when the ring is located in engagement with the edge of said support bounding said hole, the enlarged head having a greater width than that of the hole whereby the lamp holder is held resiliently in position relative to the support, the retainer ring having outer and inner edges and being formed with circumferentially staggered elongated slots extending alternatively to the outer and inner edges of the ring such that the ring is introducible through said hole from the outside of said laminar support and is engageable with said hole bounding edge by a snap action.

2. A lamp holder as claimed in claim 1 in which the outer edge of the retainer ring has a reduced thickness portion defining a notch which is engageable resiliently with said hole bounding edge.

3. A lamp holder for fixture to a laminar support surrounding a hole, said lamp holder including a plastics cover member having outer and inner portions, an enlarged head on the outer portion, a resilient retainer ring disposed around the inner portion, and abutment means on the inner portion against which the retainer ring bears when the ring is located in engagement with the edge of said support bounding said hole, the enlarged head having a greater width than that of the hole whereby the lamp holder is held resiliently in position relative to the support, the lamp holder including a plastics body having resilient means detachably securing the body to the inner portion of the cover member, said body including an electric lamp bulb housing means and electrical contact means therefor.

4. A lamp holder as claimed in claim 3 in which the bulb housing means are slidable longitudinally within the body to permit the reception of bulbs of different sizes, the electrical contact means including a bulb base contact member and means urging said contact member resiliently towards the cover member.

5. A lamp holder as claimed in claim 4 in which the body includes a tubular portion engageable with the inner portion of the cover member and, inwardly of the tubular portion, a solid portion, and in which said means urging the contact member resiliently towards the cover member comprises a helical spring housed in said solid portion.

6. A lamp holder as claimed in claim 5 in which the solid portion is formed with parallel apertures and respective conductor members electrically connected to and supporting the contact means and bulb housing means, respectively, are disposed slidably in said apertures, stop means being provided on said conductor members for limiting outward movement of said contact means and bulb housing means towards the cover member.

7. A lamp holder as claimed in claim 1 in which the surface of the inner portion of the cover member tapers in diameter outwardly from the abutment means to the enlarged head and the resilient retainer ring tapers in diameter inwardly from its outer to its inner edge.

8. A lamp holder as claimed in claim 3 in which an outer case of resilient material is detachably fitted over said body inwardly of the cover member.

References Cited

UNITED STATES PATENTS

| | | | |
|---|---|---|---|
| 2,778,930 | 1/1957 | Harrington et al. | 240—52 |
| 3,246,320 | 4/1966 | Houbolt | 240—8.16 X |
| 3,358,136 | 12/1967 | Greasley | 240—8.16 |
| 3,364,350 | 1/1968 | Larson | 240—152 |

NORTON ANSHER, Primary Examiner

R. W. ADAMS, Assistant Examiner

U.S. Cl. X.R.

240—8.16, 152; 340—381